United States Patent

[11] 3,609,603

| [72] | Inventor | Milton Lutchansky<br>Randolph Township, Morris County, N.J. |
|---|---|---|
| [21] | Appl. No. | 40,767 |
| [22] | Filed | May 27, 1970 |
| [45] | Patented | Sept. 28, 1971 |
| [73] | Assignee | Bell Telephone Laboratories, Incorporated<br>Murray Hill, N.J. |

[54] WAVEGUIDE SUPPORT SYSTEM USING CONSTANT TENSION CORD AND PULLEY ARRANGEMENTS
6 Claims, 5 Drawing Figs.

[52] U.S. Cl. .................................................. 333/95,
333/97, 138/114, 174/99, 248/54
[51] Int. Cl. ........................................... H01p 3/12,
F16l 7/00, F16l 3/20
[50] Field of Search........................................... 174/33, 99,
45 TD; 248/54 CS, 54, 364; 138/106–107,
113–114; 333/96, 95 S; 254/134.3, 198; 182/144

[56] References Cited
UNITED STATES PATENTS

| 566,849 | 9/1896 | Dusedau........................ | 212/96 |
|---|---|---|---|
| 3,007,122 | 10/1961 | Geyling ....................... | 333/95 |
| 3,143,861 | 8/1964 | Dumas ......................... | 138/114 X |
| 3,361,870 | 1/1968 | Whitehead ................... | 138/107 X |
| 3,544,702 | 12/1970 | Phillipps et al. .............. | 174/43 X |

FOREIGN PATENTS

| 556,175 | 8/1932 | Germany...................... | 254/134.3 |

*Primary Examiner*—Herman Karl Saalbach
*Assistant Examiner*—Wm. H. Punter
*Attorneys*—R. J. Guenther and Edwin B. Cave ABSTRACT: The performance of waveguide transmission lines is critically dependent upon maintenance of proper alignment of the waveguide. Thus the waveguide must be isolated from vibrations, deformations and other disturbances in the surrounding terrain. This may be accomplished by placing the waveguide in a conduit and supporting the waveguide therein by a cord and pulley arrangement.

INVENTOR
M. LUTCHANSKY
BY
ATTORNEY

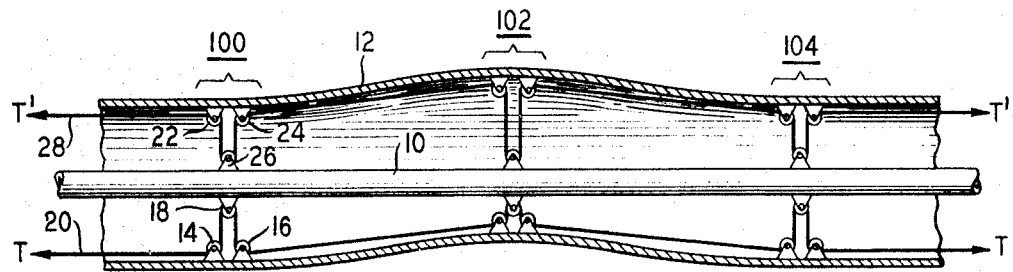
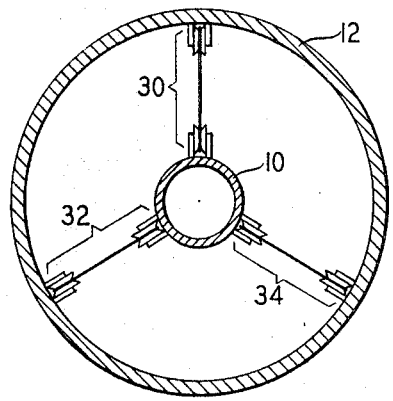
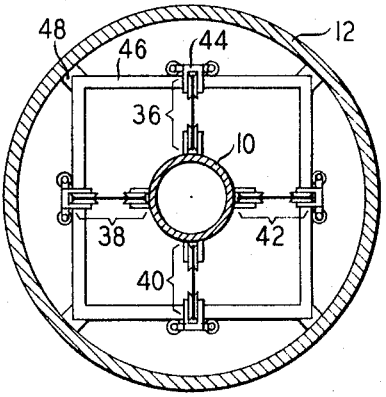
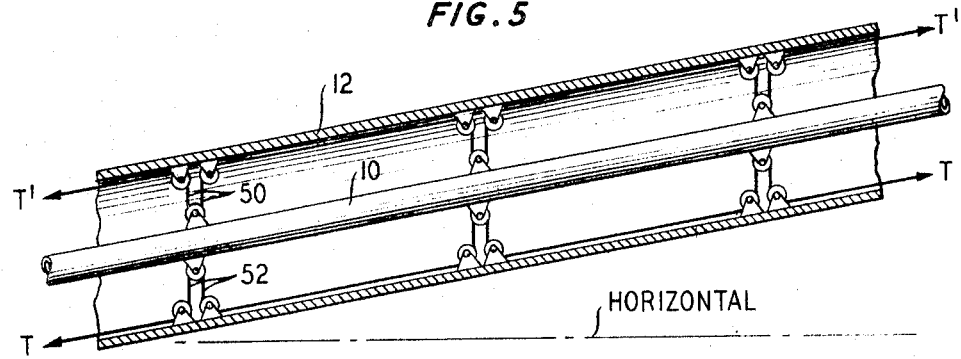

WAVEGUIDE SUPPORT SYSTEM USING CONSTANT TENSION CORD AND PULLEY ARRANGEMENTS

BACKGROUND OF THE INVENTION

1. Field of the Invention

This invention relates to a system for supporting a waveguide transmission line. More particularly, it relates to a system which utilizes simple apparatus for supporting a waveguide transmission line and isolating it from disturbances in the surrounding terrain which would otherwise degrade the performance of the transmission line.

2. Background of the Invention

The ever growing demand for communication facilities is producing an increasing interest in possible use of waveguide transmission lines as extremely broad frequency band, long-distance transmission media. One requirement for such a waveguide transmission system is that the system must be isolated from disturbances in the surrounding environment because the performance of the waveguide is critically dependent upon the maintenance of proper alignment and position. Thus, buried waveguide in particular must be protected from disturbances in the surrounding soil such as vibrations, faultings, and earth tremors.

A limited degree of isolation may be achieved by simply enclosing the waveguide in a relatively large diameter conduit. When disturbances in the surrounding terrain distort the conduit, the waveguide can move away from the conduit walls and thereby maintain its alignment.

An improved waveguide support system was disclosed in U.S. Pat. No. 3,007,122 issued to F. T. Geyling on Oct. 31, 1961. Geyling teaches mounting the waveguide on fluid-filled flexible members or bellows interconnected by a feeder tube and surrounding the supported waveguide with a protective conduit. However a complete loss of isolating support would result if a leak should develop in such pressured systems.

Accordingly, it is an object of this invention to simplify the apparatus for supporting waveguide transmission media and isolating it from disturbances in the surrounding environment.

Another object is to provide a waveguide support system which utilizes simple mechanical elements.

SUMMARY OF THE INVENTION

The foregoing objects and others are achieved in accordance with the principles of this invention by supporting the waveguide within a conduit with a pulley and cord system which utilizes solid elements exclusively. Sets of low-friction pulleys are placed on both the waveguide and surrounding conduit at appropriately spaced support points. The pulleys are interconnected by a continuous cord member which thereby provides equal support forces at each support point. Distortions of the conduit from disturbances in the surrounding terrain do not change the equality of these support forces because the distortions are accommodated by a shifting or redistribution of the interconnecting cord. Thus the waveguide itself maintains its required alignment as there are no unbalanced forces to cause portions of it to distort.

DESCRIPTION OF THE DRAWINGS

The invention will be more fully comprehended from the following detailed description and accompanying drawings in which:

FIG. 2 is a diagram illustrative of the manner in which the waveguide is isolated from deformations of the conduit resulting from disturbances in the surrounding soil;

FIG. 3 illustrates in cross section a second embodiment of the support system which provides improved horizontal and vertical stabilization and isolation of the waveguide;

FIG. 4 illustrates in cross section still another embodiment of the support system which may advantageously be used where large disturbances of the surrounding terrain are expected; and FIG. 5 illustrates the use of the support system of FIG. 1 on a slope or incline.

DETAILED DESCRIPTION

Figure 1:
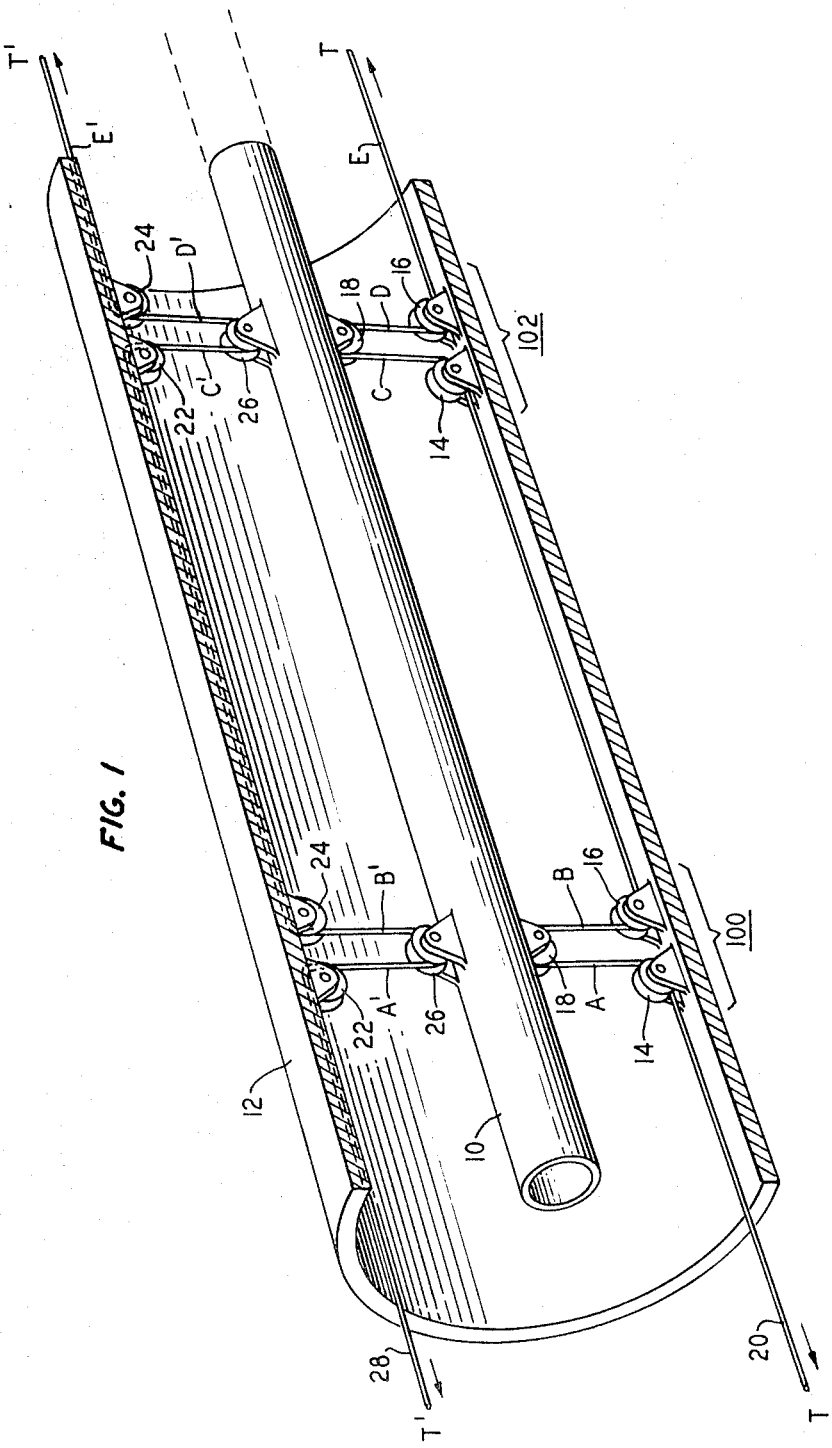
FIG. 1 is an illustration in perspective of a waveguide support system embodying the principles of the invention.

FIG. 1 illustrates a waveguide 10 supported in a surrounding conduit 12 and isolated from deformations thereof by a support system embodying the principles of this invention. The waveguide 10 may be of any desired type and the conduit 12 may, for example, be a steel tube or plastic or cement-asbestos pipe. The conduit 12 is substantially larger than the waveguide 10.

The waveguide 10 is suspended from the top wall of the conduit 12 by a first pulley arrangement. This pulley arrangement includes two series of low-friction pulleys 22 and 24 mounted to the walls of the conduit 12 at appropriately spaced points 100 and 102 and interconnected by a continuous cord member 28 with a third series of low-friction pulleys 26 mounted on the surface of waveguide 10. A similar second pulley arrangement comprising pulleys 14 and 16 on the bottom wall of conduit 12 and interconnected by a continuous cord 20 to pulleys 18 on waveguide 10 positions waveguide 10 with respect to the bottom wall of conduit 12.

The pulleys 14, 16, 18, 22, 24, and 26 should be made as frictionless as is reasonably feasible for reasons which will become more apparent in the following description. The amount of friction which can be tolerated will depend upon the stiffness of waveguide 10. For a very stiff waveguide, cord or wire guides having substantial friction may even be substituted for the pulleys.

Cords 20 and 28 may be made of any flexible material having sufficient strength and wear properties. Nylon or wire could, for example, be suitable materials. The use of a compliant or elastic material in cords 20 and 28 would improve the functioning of the support system as an isolator.

Since the cords 20 and 28 interconnecting the low-friction pulleys are continuous, the tension in each cord will be the same at any point along that particular cord. For example, if a tension T is applied to the ends of cord 20, that same tension will appear at points, A, B, C, D, and E, etc. Likewise, the tension T' applied to the ends of cord 28 will appear at points A', B', C', D', and E', etc. Cords 20 and 28 do not have the same tension.

As shown more clearly in FIG. 2, when the surrounding conduit 12 is deformed at a particular point by disturbances in the surrounding soil, the alignment of waveguide 10 is maintained because there are no unbalanced forces at that point to cause a corresponding deformation of waveguide 10. The deformation of conduit 12 is accommodated by a redistribution of cords 20 and 28 between the pulleys at the support points 100, 102, and 104. Specifically, in the first or top pulley arrangement when the conduit 12 deforms as shown, a larger proportion of cord 28 is required at support point 102 and smaller proportions may be required at support points 100 and 104. Similarly, in the second or bottom pulley arrangement, a smaller proportion of cord 20 is required at support point 102 and larger proportions may be required at support points 100 and 104. The amount of redistribution of cords 20 and 28 between the pulleys will depend upon the magnitude and acuteness of the deformation in conduit 12. Since the total length of each of cords 20 and 28 remains constant, waveguide 10 will translate or move as a rigid body a small distance toward one side of conduit 12. In the deformation shown in FIG. 2, the movement will be toward the top or the side along which cord 28 is mounted. However, the alignment of waveguide 10 is not disturbed by such translation.

Support points 100, 102, and 104 may be spaced on the order of a few feet depending upon such factors as the weight and stiffness of waveguide 10 and magnitude of the disturbances expected in the surrounding terrain.

Waveguide transmission media using the support system may be manufactured in units or sections and joined during installation in the field. The cords from individual sections may be connected as the sections are coupled during installation.

Alternatively, the waveguide support system could be made independent for each waveguide section by attaching the cords to rigid bulkheads at each end of each waveguide section.

FIG. 3 illustrates a waveguide support system which gives substantially more horizontal stabilization than the system shown in FIG. 1 and 2. This system comprises three pulley arrangements 30, 32 and 34, at substantially equal angular spacings about waveguide 10, or at least symmetrically placed with respect to a vertical diameter, furnishing both horizontal and vertical stabilization. The operation of each of these pulley arrangements is similar to that previously described for the two-pulley system.

In locations where disturbances creating extreme distortions in both the horizontal and vertical directions are expected, a more complicated support system may be required. Such a system is shown in FIG. 4. This system includes a rectangular frame 46 mounted to the conduit 12 and support points 48. Four orthogonal sets of pulley supports 36, 38, 40, and 42, similar to the supports previously described, suspend the waveguide 10 from the frame 46. The vertical pulley systems 36 and 40 and horizontal pulley systems 38 and 42 are attached to dollies 44 which are able to move horizontally and vertically, respectively, on frame 46 to aid in accommodating major distortions of conduit 12.

As shown in FIG. 5, the pulley support system will function satisfactorily on slopes and inclines. In such applications the position of the pulleys on waveguide 10 and conduit 12 must be shifted with respect to each other an amount sufficient to insure that those portions of the cords 50 and 52 between pulleys remain vertical. Otherwise unbalanced horizontal forces will tend to cause the waveguide to move.

The embodiments disclosed are merely illustrative of the principles of the invention and various modifications thereto might be made without departing from the spirit and scope of the invention. For example, various pulleys, such as pulleys 22 and 24, might be combined on a single shaft. Different numbers of pulley systems might be used. A single pulley system would suffice under certain conditions. In some applications there may be no necessity for a protective conduit surrounding the waveguide. In such applications, a simple support frame to which the pulleys could be attached would be adequate.

What is claimed is:

1. In combination, a waveguide transmission line and a system for supporting said line and isolating said line from disturbances in the surrounding environment, said supporting system comprising:
   a protective conduit surrounding said line;
   a series of first and second low-friction pulleys mounted at spaced points along said line and said conduit respectively; and
   a continuous cord means interconnecting all of said pulleys to provide equal support forces for said line at said points;
   whereby said line is isolated from movement of said conduit caused by said disturbances by an interchange of said cord between said pulleys.

2. Apparatus in accordance with claim 1 including:
   a plurality of series of first and second low-friction pulleys mounted along said line and said conduit respectively;
   said plurality of series of first and second pulleys being positioned symmetrically about a vertical diameter of said line and said conduit respectively; and
   a plurality of continuous cord means interconnecting all pulleys of each of said series, to thereby provide support and isolation for said line in a plurality of directions.

3. Apparatus in accordance with claim 2 including a rectangular frame mounted within said conduit at said points; and
   means for movably mounting each of said second pulleys on said frame whereby each of said series of said pulleys can accommodate a distortion of said conduit by movement along said frame.

4. Apparatus in accordance with claim 1 wherein said cord comprises a resilient material.

5. A waveguide support system comprising:
   a tube of strong material surrounding said waveguide and spaced therefrom;
   first and second sets of low-friction pulleys mounted at spaced points along said waveguide and said tube respectively; and
   a continuous cord member interconnecting said pulleys thereby to provide equal support forces for said waveguide at said points.

6. The method of supporting a waveguide transmission line within a conduit having a first set of low friction pulleys mounted thereon at spaced points, said line having a second set of low-friction pulleys mounted thereon at said points, comprising the steps of:
   interconnecting said first and second sets of pulleys with a continuous cord means; and
   applying a tension to the ends of said cord means thereby to provide equal support forces to said line at said points.